(12) United States Patent
Prince

(10) Patent No.: US 6,205,201 B1
(45) Date of Patent: Mar. 20, 2001

(54) TELEPHONE LINE TESTING DEVICE

(75) Inventor: Paul R. Prince, San Juan Capistrano, CA (US)

(73) Assignee: iCo Corporation, Reno, NV (US)

( * ) Notice: Subject to any disclaimer, the term of this patent is extended or adjusted under 35 U.S.C. 154(b) by 0 days.

(21) Appl. No.: 08/876,923

(22) Filed: Jun. 16, 1997

(51) Int. Cl.[7] .............................. H04M 1/24; H04M 3/08; H04M 3/22
(52) U.S. Cl. ................................. 379/27; 379/21; 379/29
(58) Field of Search .................... 379/1, 21, 27, 379/32, 11, 18, 22, 29, 34, 28

(56) References Cited

U.S. PATENT DOCUMENTS

| | | |
|---|---|---|
| 4,513,179 | 4/1985 | Phillips et al. . |
| 4,533,864 | 8/1985 | Austin . |
| 4,564,728 | 1/1986 | Romano . |
| 4,581,494 * | 4/1986 | Pickens . |
| 4,600,810 | 7/1986 | Feldman et al. . |
| 4,626,633 | 12/1986 | Ruehl et al. . |
| 4,736,403 | 4/1988 | MaAlvey et al. . |
| 4,827,498 | 5/1989 | Ross . |
| 4,920,555 | 4/1990 | Ingalsbe . |
| 5,056,131 * | 10/1991 | Kanare et al. .......................... 379/27 |
| 5,218,616 * | 6/1993 | Stephens ................................ 379/27 |
| 5,511,108 * | 4/1996 | Severt et al. ........................... 379/21 |
| 5,532,898 * | 7/1996 | Price . |
| 5,768,341 * | 6/1998 | Pryor et al. ............................. 379/2 |

* cited by examiner

*Primary Examiner*—Duc Nguyen
(74) *Attorney, Agent, or Firm*—Knobbe, Martens, Olson & Bear LLP

(57) ABSTRACT

A telephone line testing device detects the integrity of a telephone loop connected to a subscriber's modular telephone jack. The device includes a modular connector at a far end of a flexible electrically conductive cable, the other end of the cable terminating in a circuit enclosure housing a testing circuit. The testing circuit, when connected through the cable and modular connector to the telephone line, presents a low impedance to the line, drawing the line "offhook." The testing circuit then tests the current potential of the line, and, if the current is excessive, presents a visual indication thereof. If the tip and ring signals of the telephone loop are reversed, reverse polarity is visually indicated. Otherwise, if the tested current falls within a predefined acceptable range, a visual indication that the telephone line is in working order is provided.

2 Claims, 4 Drawing Sheets

TELEPHONE LINE TESTING DEVICE

FIELD OF THE INVENTION

The present invention relates to an inexpensive, reliable phone line test device for use in traveling and home, which indicates whether a phone line is safe for connection with a modem of a computer.

BACKGROUND OF THE INVENTION

Increasingly, various types of telephone systems are being used today that terminate in a standard wall-type modular jack, such as the "RJ-11" and "RJ-14" standard modular jacks in North America. Other standard phone jacks are used throughout the world. Other, non-standard phone lines, such as those of high-voltage digital or analog PBX systems, while terminating in a standard phone jack, sometimes provide current capacity that will damage standard equipment. Thus, as people travel with devices that use phone lines, such as portable fax machines and portable computer modems, there is an increasing need for travelers to be able to identify standard telephone lines from non-standard, potentially damaging lines.

There are a variety of conventional telephone line testing devices, most of which are used primarily to determine if a fault condition exists on the telephone line at a given location. Many of these do not provide enough information to the traveler who is seeking to protect his equipment from dangerous current flow.

Such conventional testers are merely simplified devices which use red or green light emitting diodes (LEDs) and resistors to indicate the polarity of the telephone line. One such tester is known and commercially available as "BT-71 Deluxe Phone Line Tester" manufactured by Black Point Products, Point Richmond, Calif., and Radio Shack Catalog Number 43-104 "Phone Line Tester". Other such devices are disclosed in U.S. Pat. No. 4,827,498 to Ross, U.S. Pat. No. 4,626,633 to Ruehl at al., U.S. Pat No. 4,600,810 to Feldman et al., U.S. Pat. No. 4,564,728 to Romano, and U.S. Pat. No. 4,920,555 to Ingalsbe. High current conditions are not tested with these devices. As a result, if one of these devices is used to test a line that has dangerously high current potential, the light emitting diodes (LEDs) of such devices will indicate that power is present and may be illuminated very brightly. But it is impossible for the user of such a device to determine if a dangerous line condition of excessive current potential exists.

More complex examples of telephone line testing circuits have been marketed by IBM and Road Warrior International, and are described as "Modem Saver™" devices. Each of these devices employs full-wave rectifiers to supply circuitry for detecting excessive current or voltage, and a reverse polarity indicating yellow LED. The IBM device (disclosed in U.S. Pat. No. 4,533,864) generally measures the current flow capacity of the telephone line, but has temperature dependent trip point characteristics. The Road Warrior device (Road Warrior International part# MODS0001) presents a relatively high line impedance and a complex interaction between the "danger" indicating red LED initiating voltage and a green "safe to use" LED trip-off circuit. Five one-percent resistors are utilized to attempt to match these circuits, but are also plagued with undue temperature dependence of trip thresholds. Neither of these "Modem Saver™" prior art devices provide safety provisions against high currents associated with power lines shorting to telephone lines. Further, neither of these devices can be easily modified to provide different trip points for the safe/alarm threshold.

What is therefore needed is a portable, low cost, precision current-measuring system to warn modem users when telephone lines present excessive current capacity that may be hazardous to their modems, other equipment, or to the user of such a device. What is also needed is to provide safety against smoke and fire or explosion in the event that such excessive current capacity is detected. A need is for provision of a universal current test instrument that is precise, safe, and low in cost, and which provides a test instrument easily modified for special purpose communication lines or other power sources and special purpose communication or other special purpose equipment in which the safe/alarm threshold is easily adjusted. The ability to indicate and/or test the functioning of the alarm indicating circuitry is also needed in some applications.

SUMMARY OF THE INVENTION

A telephone line testing device detects the integrity of a telephone loop connected to a subscriber's modular telephone jack. The device includes a modular connector a far end of a flexible electrically conductive cable, the other end of the cable terminating in a circuit enclosure housing a testing circuit. The testing circuit, when connected through the cable and modular connector to the telephone line, presents a low impedance to the line, drawing the line "offhook." The testing circuit then tests the current potential of the line, and, if the current is excessive, presents a visual indication thereof. If the tip and ring signals of the telephone loop are reversed, reverse polarity is visually indicated. Otherwise, if the tested current falls within a predefined acceptable range, a visual indication that the telephone line is in working order is provided.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
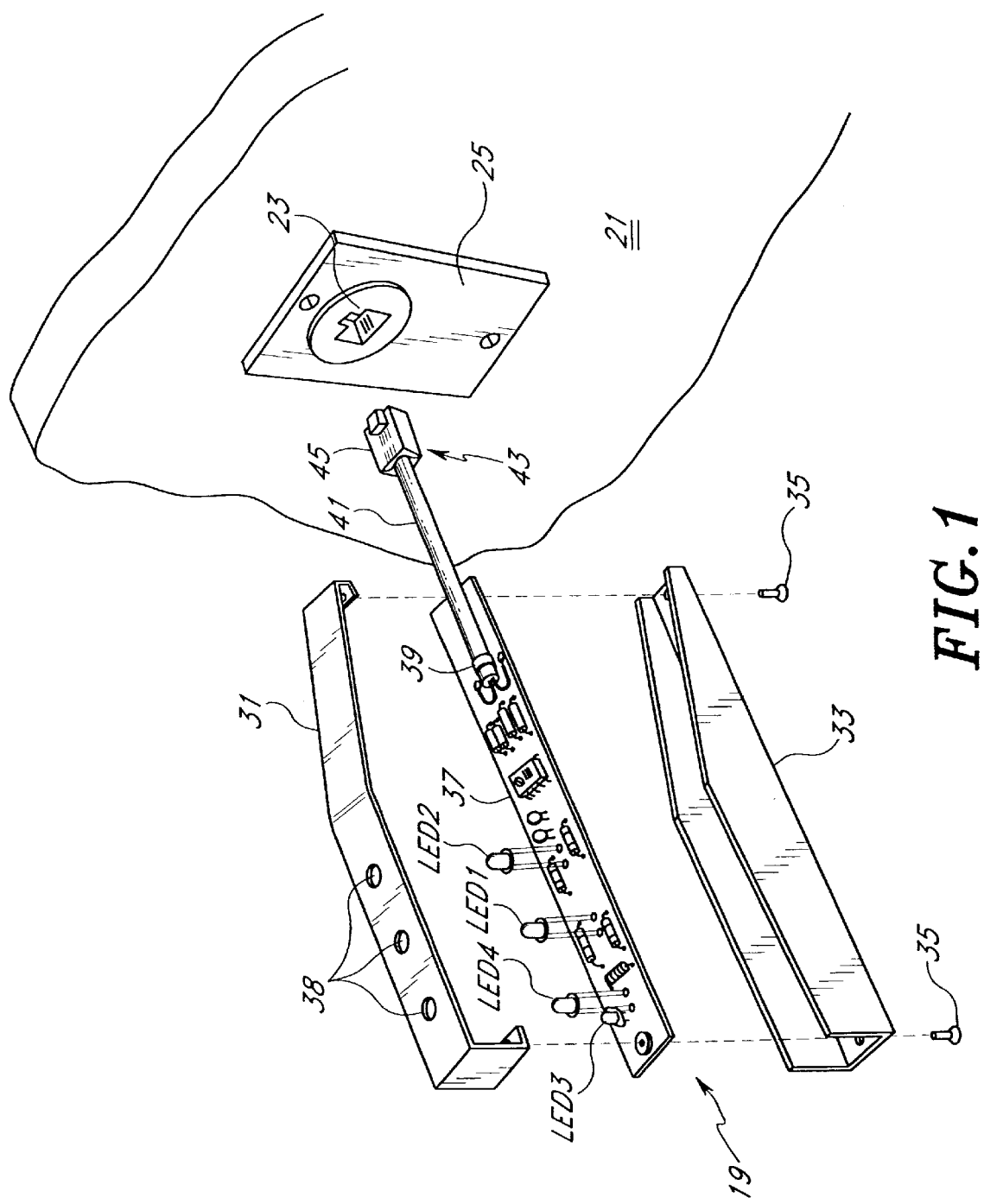
FIG. 1 is an exploded perspective illustration of the hardware components of the invention.

Referring to FIG. 1, an exploded view of a tester 19 is shown in relation to a section of wall 21 having a suitable telephone jack 23 mounted within a wall plate 25. The jack shown is for insertion of an RJ-11 plug as is typical in North America. The invention can work well with a variety of plugs, and the RJ-11 configuration shown is but one.

The tester 19 has an upper housing 31 which interfits with a lower housing 33. The upper housing 31 and lower housing 33 may be snap joined, or joined with screws 35 shown here, or any combination thereof. A circuit board 37 is secured between the upper housing 31 and lower housing 33.

The circuit board 37 also supports a series of light emitting diodes LED1, LED2, and LED4 which can be seen through a series of three apertures 38 in the upper housing 31, and which will be explained later in greater detail.

The circuit board 37 strongly supports a tough resilient connector 39 which should be able to withstand significant pulling and twisting force without sustaining damage. The connector 39 is connected to a short length of cable 41 which should match the strength of the connector 39 since most of the stress forces will be transmitted to the connector 39 through the cable 41.

The end of cable 41 contains an RJ-11 connector 43 having a rectangular body 45 and lacking a normally present clip connector which would otherwise facilitate holding the tester 19 in place after insertion into the female jack 23. Lack of a clip connector prevents the device from being left in the telephone jack 23 for extended periods of time and ensuring a momentary duration test. Where a modular connector 43 is supplied with a locking clip, it may be easily removed by cutters or other means.

Figure 2:
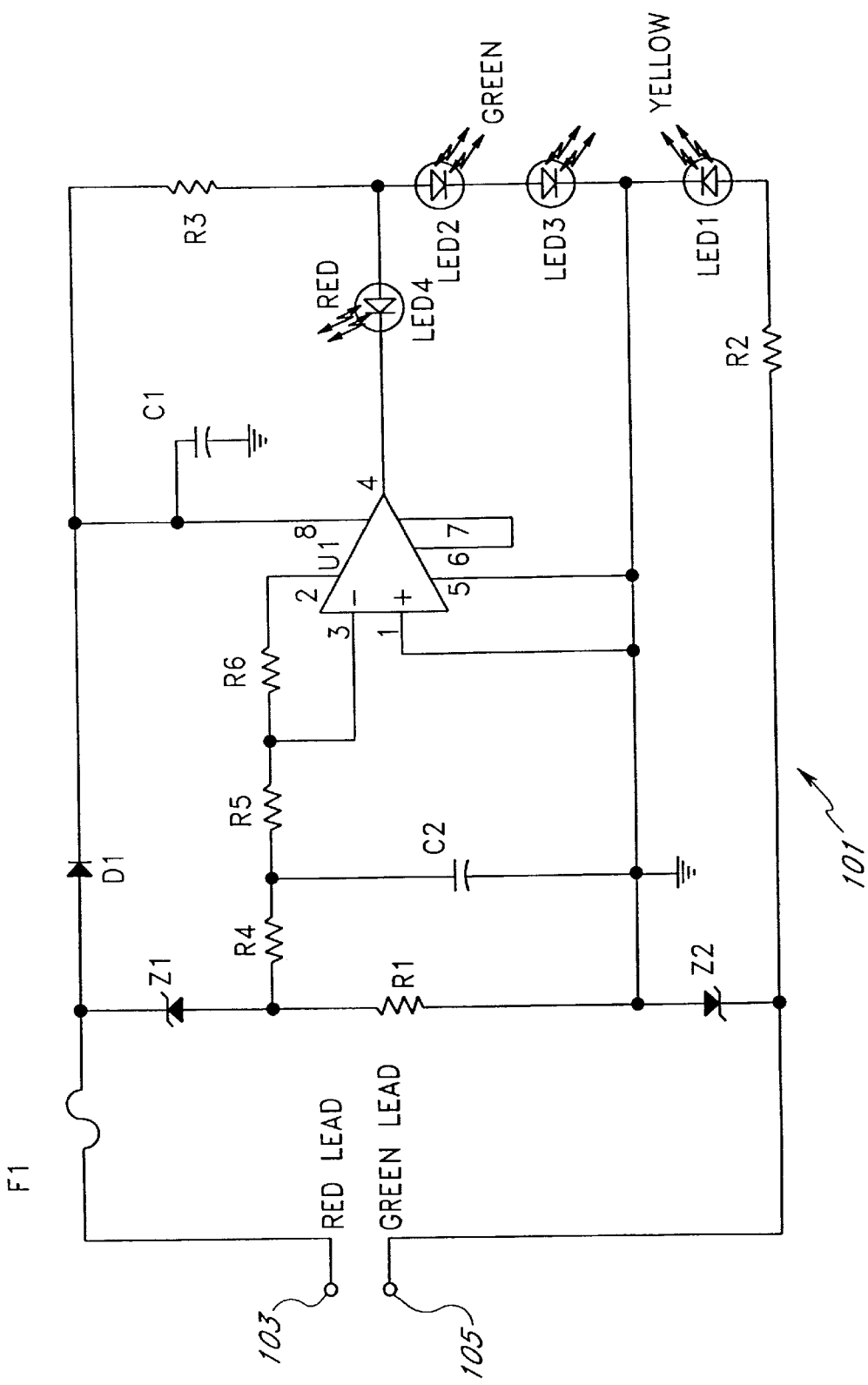
FIG. 2 is a detailed electronic schematic diagram of a first embodiment of the testing circuit of the invention.

Referring to FIG. 2, a schematic diagram of the circuit for the tester 19 illustrated. Although a telephone jack, such as jack 23 may have other connections, including additional lines and others, the circuitry concentrates only on the current supplying potential of the two signal lines, which sometimes, if found wired properly, occur as red and green lines. At the left side of FIG. 2, the upper line is designated as "Red Lead", numbered 103, and leads to a 0.125 amp fast acting fuse F1 which protects against smoke, fire, and explosion in the event that the line has very high voltage and current capacity by quickly opening internally without release of spark, flame, or smoke. The other end of fuse F1 is connected to the anode of a diode D1, and to the cathode of a zener diode Z1 having a 5.1 volt voltage regulation value. The anode of zener diode Z1 is connected through a resistor R1 to the anode of a zener diode Z2 and to ground, the cathode of zener diode Z2 connected to the second input line 105 of the schematic of FIG. 2, is labeled "Green Lead".

"Green Lead" line 105 is also connected through a resistor R2 to the anode of a light emitting diode LED1, which preferably outputs a yellow light. The cathode of LED1 is connected to ground.

The cathode of diode D1 is connected through a resistor R3 to the anode of a light emitting diode LED2 which preferably outputs a green light. LED2 emits light only if the telephone line supplies enough current to operate most modems, such as approximately 6 millamperes or more. The cathode of LED2 is connected to the anode of light emitting diode LED3 not visible when circuit 101 is enclosed it its housing, including upper housing 31 and lower housing 33. The cathode of LED 3 is connected to ground.

The cathode of diode D1 is connected through a capacitor C1 to ground. The anode of zener diode Z1 is connected through a resistor R4 to one side of a capacitor C2, the other side of capacitor C213 connected to ground.

The junction between resistor R4 and capacitor C2 is connected through a resistor R5 to a first end of a resistor R6.

The heart of the circuit of FIG. 2 is a comparator type integrated circuit U1. This device is commercially available as part No. RH338/KP, and is readily available from AR Industries, Fountain Valley, Calif.

This device has eight terminal connections, and are shown numbered in the schematic. Terminal 1 is connected to ground, terminal 2 is connected to the second end of resistor R6, terminal 3 input is connected to the junction between resistors R5 and R6.

The anode of light emitting diode LED2 is connected to the anode of a light emitting diode LED4, which preferably outputs a red light, with its cathode connected to terminal 4 output of U1. Terminal 5 of U1 is connected to ground and terminals 6 and 7 of U1 are connected to ground. Terminal 8 is connected between the junction of capacitor C1 and the cathode of diode D1. The following Table 1 lists the values of the components in FIG. 2.

TABLE 1

Typical Values For The Elements Shown in FIG. 2

| COMPONENT | TYPE | VALUE |
| --- | --- | --- |
| C1 | capacitor | 1.0 μF |
| C2 | capacitor | 1.0 μF |
| R1 | resistor | 10.5 Ω |
| R2 | resistor | 160 Ω |
| R3 | resistor | 160 Ω |
| R4 | resistor | 30K Ω |
| R5 | resistor | 30K Ω |
| R6 | resistor | 300K Ω |

Illumination of green LED2 and red LED4 indicates a "safe" and "unsafe" or "alarm" condition respectively. When current flows in the reverse direction, "Green" line 105 has the higher potential, and yellow LED1 illuminates. This indication of reversed polarity directs the user to make use of a polarity reversing adapter which may be included in the user's electronics.

U1 accurately measures current flow in the current loop to define either "safe" or "alarm" by causing either green LED2 or red LED4 conduction respectively. The other circuit components, also readily available, are commonly known by those skilled in the art. Resistor R1 may be changed to adjust the alarm trip point according to the relationship:

Trip Current=10+(1150÷R1) milliamps.

In alternate embodiments not shown, a series of resistors, selectable with a rotary switch for example, may be employed to allow users to set precision multiple or customized trip current values. At the instant that circuit 101 is connected to a subscriber telephone loop line, the line may be in a noisy environment, or may have significant energy stored upon its inherent capacitance or capacitance of associated connected telephone equipment or subscriber equipment, or may be in the presence of a high voltage ring signal. If U1 is allowed to trip to the "alarm" state, the hysteresis will contaminate the precision current measurement between "safe" and "alarm" states. Such a false trip upon connection to the line is avoided through the low pass filtering function of capacitor C2 in combination with resistors R1 and R4, with a time constant of approximately 30 milliseconds when the preferred values of Table I are used. Comparator type operation, well known by those skilled in the art, provides either a high impedance or a current sink at output pin 4 depending upon the difference between an internal reference to external voltage at pin 3. When the alarm state is detected, U1 sinks current from resistor R3 through LED4, illuminating LED4 and starving LED2 of its current. LED3 is employed in a bias function to allow substantially a current through resistor R3 to flow through LED4 when in the alarm state.

In the reverse polarity condition on the telephone line, zener diode Z1 becomes forward biased whereas zener diode Z2 of a voltage regulation value approximately 3.6 volts reverse biases and provides circuit excitation voltage to resistor R2 and LED 1, which illuminates yellow to indicate reverse polarity. Meanwhile, forward biased zener diode Z1 maintains safe reverse voltage to precision comparator U1 with isolation provided by diode D1. Internally floating pins 1, 6, & 7 of U1 may be connected to ground for noise reduction.

Figure 3:
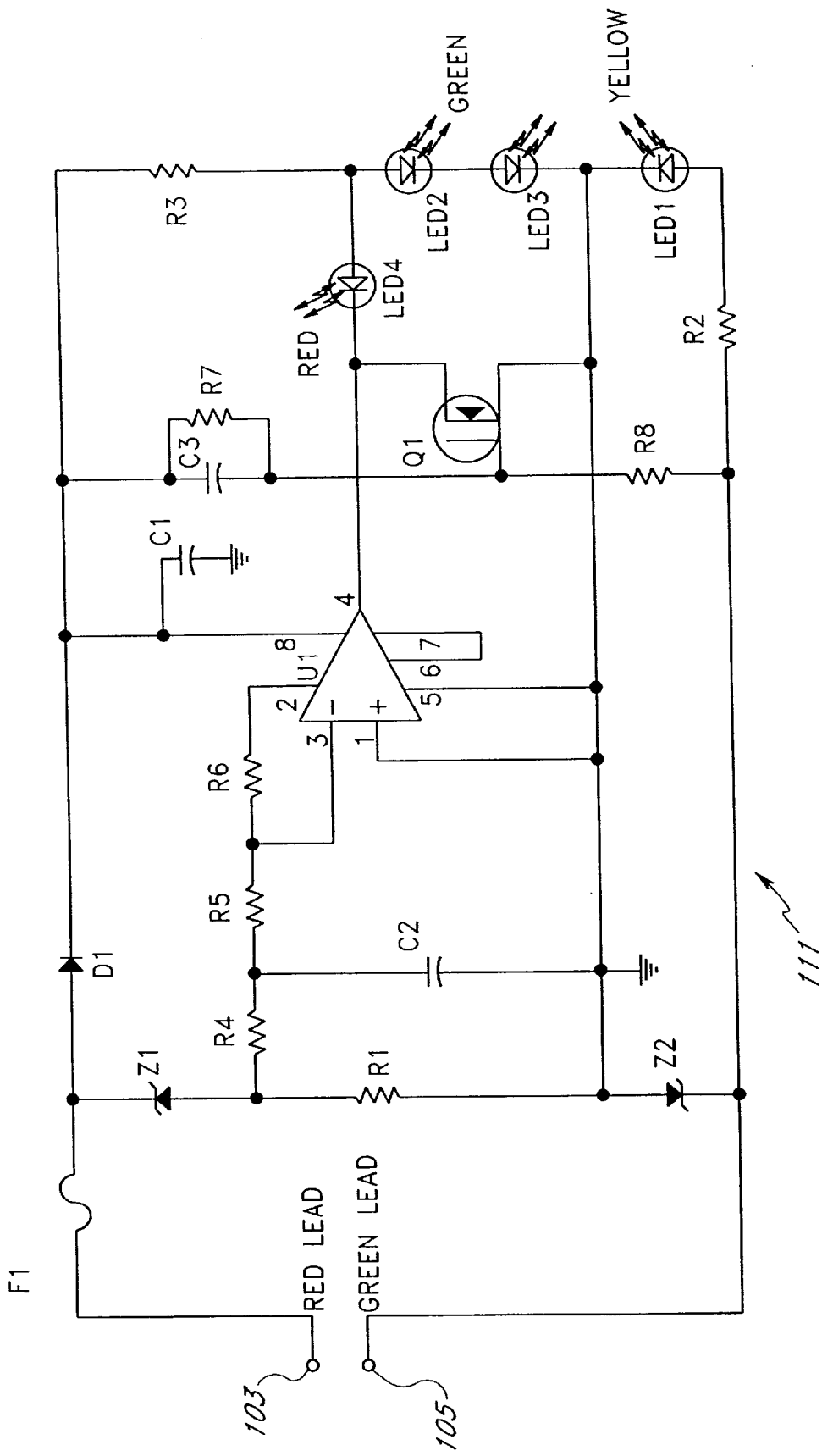
FIG. 3 is a detailed electronic schematic diagram of a second embodiment of the testing circuit of the invention.

Referring to FIG. 3, a circuit 111 is substantially the same as circuit 101 with some exceptions. When an operator uses the embodiment of FIG. 2, an immediate green LED2, or an immediate yellow LED1 will usually be observed at startup. The user may be anxious regarding the integrity of the circuit. With the addition of four components shown in FIG. 3, and upon initial connection to a telephone line, the red LED4 illuminates for a brief instant to check the red LED4 function.

Referring to FIG. 3, the cathode of diode D1 is connected through a parallel combination of a capacitor C3 and resistor R7 to the gate of an N-channel MOSFET transistor Q1. The gate of N-channel MOSFET transistor Q1 is also connected through a resistor R8 to the cathode of zener diode Z2. The drain of Q1 is connected to the cathode of LED4, and the source of Q1 is connected to ground.

Q1 couples the red LED4 output to ground upon application of positive voltage to circuit 111 by virtue of gate bias supplied from capacitor C3, which is normally held discharged by resistor R7. With a time constant of approximately R8 times C3, resistor R8 discharges capacitor C3 toward the negative "Green" lead input line 105 thereby turning off Q1 and allowing U1 to define the state of LED4. The time duration of the red LED4 check using the preferred component values of Table 2 is approximately 0.25 to 0.75 second. The following Table 2 lists the values of the components in FIG. 3.

TABLE 2

Typical Values For The Elements Shown in FIG. 3

| COMPONENT | TYPE | VALUE |
| --- | --- | --- |
| C1 | capacitor | 1.0 μF |
| C2 | capacitor | 1.0 μF |
| C3 | capacitor | 1.0 μF |
| R1 | resistor | 10.5 Ω |
| R2 | resistor | 160 Ω |
| R3 | resistor | 160 Ω |
| R4 | resistor | 30 KΩ |
| R5 | resistor | 30 KΩ |
| R6 | resistor | 300 KΩ |
| R7 | resistor | 200 KΩ |
| R8 | resistor | 1.0 MΩ |

For more demanding medical or emergency applications of telephone line testing, it may be desirable to include a complete functional check of the circuitry, especially U1 and LED4. This is achieved in the third embodiment of the circuit schematic of FIG. 4. Here the schematic differs more significantly from the schematic of FIG. 2. The connection between R5 and R6 is broken and R7 and R8 and Q1 occupy new positions.

Taken as a departure from FIG. 2, resistor R5 has a first end connected between the junction of resistor R4 and capacitor C2 and a second end connected to the source of an N-channel MOSFET Q1. Q1 has a gate connected to the cathode of Z2 through a parallel combination of capacitor C3 and a resistor R7. The gate of Q1 is also connected to the cathode of D1 through a resistor R8.

Q1 has its drain connected to input terminal 3 of U1 and connected to terminal 2 of U1 through resistor R6, and to the cathode of diode D1 through a resistor R9. The following Table 3 lists the values of the components in FIG. 4.

TABLE 3

Figure 4:
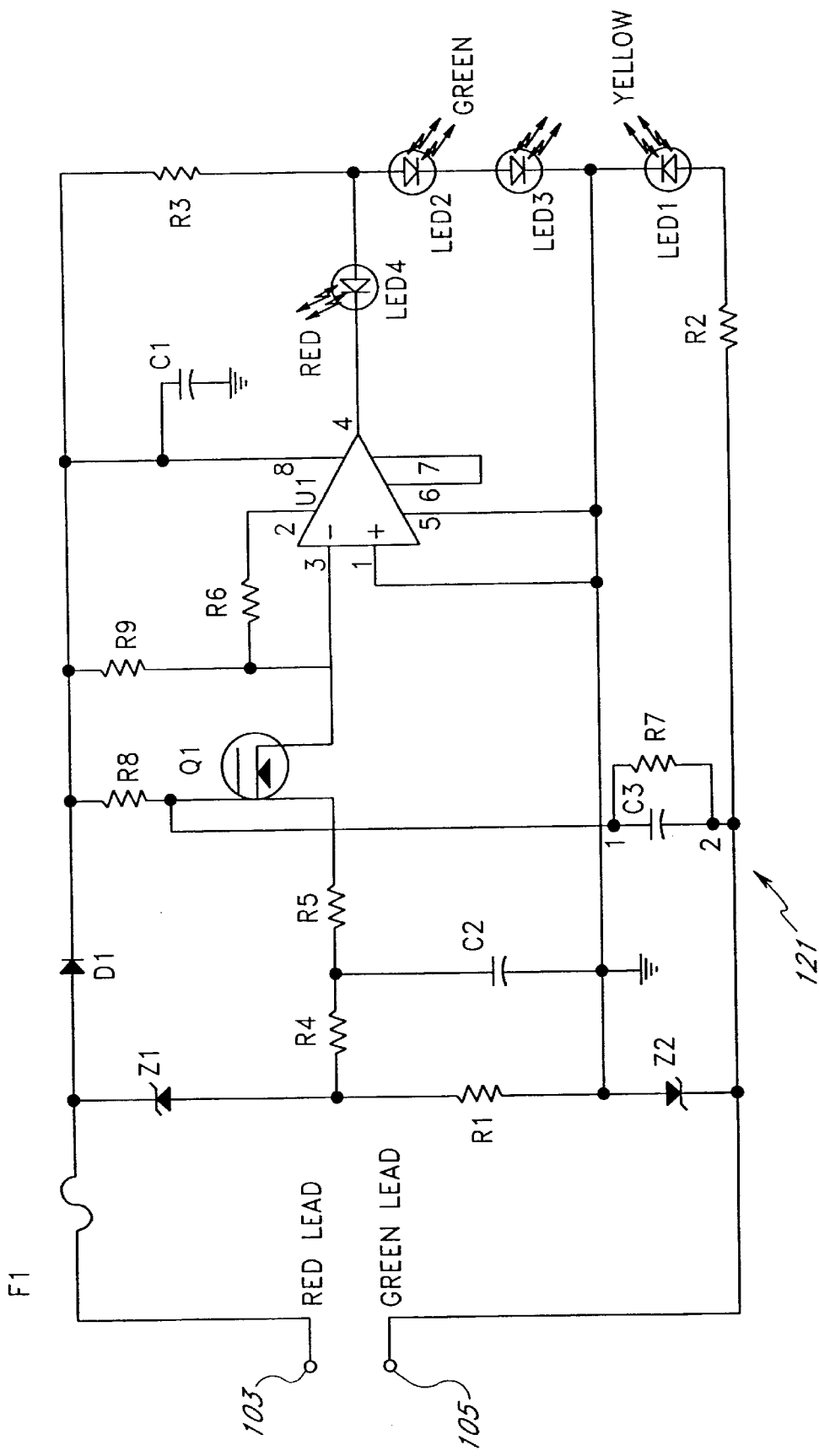
FIG. 4 is a detailed electronic schematic diagram of a third embodiment of the testing circuit of the invention.

Typical Values For The Elements Shown in FIG. 4

| COMPONENT | TYPE | VALUE |
| --- | --- | --- |
| C1 | capacitor | 10 μF |
| C2 | capacitor | 1.0 μF |
| C3 | capacitor | 1.0 μF |
| R1 | resistor | 10.5 Ω |
| R2 | resistor | 160 Ω |
| R3 | resistor | 160 Ω |
| R4 | resistor | 30K Ω |
| R5 | resistor | 30K Ω |
| R6 | resistor | 300K Ω |
| R7 | resistor | 200K Ω |
| R8 | resistor | 1.0M Ω |
| R9 | resistor | 6.8M Ω |

The operation of circuit 121 is similar to that of circuit 111 except that the state of Q1 changes from open to conducting rather than conducting to open. After a short time set by the time constant approximately R8 times C3, Q1 connects resistor R5 to the node joining resistor R4 and Capacitor C2 to allow U1 to perform according to the description associated with FIG. 2 circuit 101.

Prior to conduction of Q1, integrated circuit U1 senses the voltage defined by the combination of resistor R9 and hysteresis resistor R6 which causes the alarm indicator red LED4 to illuminate briefly as a substantially thorough alarm detection test.

The circuits 101, 111, & 121 all have an input impedance of about 15 ohms. The over current test is performed to see if the telephone line is safely current self limiting, regardless of its initial or no current voltage.

While the present invention has been described in terms of a tester for a telephone line, one skilled in the art will realize that the structure and techniques of the present invention can be applied to many similar devices. The present invention may be applied in any situation where quick testing is needed to prevent harm to equipment.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A tester for precisely testing the current supplying capacity in a telephone line comprising:

test circuitry supported within a housing and having two electrical inputs and at least a first indicator indicating a safe current condition between said two electrical inputs, a second indicator indicating an unsafe current condition between said two electrical inputs, and a third indicator indicating polarity; and a connector having two terminals each connected to an associated one of said inputs;

wherein said two electrical inputs include a first input and a second input, and wherein said test circuitry further comprises:

a first zener diode having a cathode connected to said first input, and an anode;

a second zener diode having a cathode connected to said second input, and an anode;

a first resistor connected between the anodes of said first and second zener diodes;

a polarity light emitting diode having a cathode connected to ground and an anode;

a second resistor connected between said cathode of said second zener diode and said anode of said polarity light emitting diode;

a first diode having an anode connected to said first input and a cathode;

a third resistor having a first end connected to said cathode of said first diode, and a second end;

a normal indicator light emitting diode having a cathode connected to said second end of said third resistor, an anode connected to ground;

a fourth resistor having a first end connected to said anode of said first zener diode and a second end;

a first capacitor connected between said cathode of said first diode and ground;

a second capacitor connected between said second end of said fourth resistor and ground;

a fifth resistor having a first end connected to said second end of said fourth resistor, and a second end;

a sixth resistor having a first end connected to said second end of said fifth resistor, and a second end;

a comparator integrated circuit having a positive input connected to said second end of said fifth diode, a negative input connected to ground, and a first input connected to said second end of said sixth resistor, and a second input connected to said cathode of said first diode; and a warning light emitting diode having an anode connected to said second end of said third resistor and a cathode connected to said output of said comparator integrated circuit.

2. The tester as recited in claim 1 and further comprising a fast acting fuse connected in series between said first input and said cathode of said first zener diode.

* * * * *

UNITED STATES PATENT AND TRADEMARK OFFICE
CERTIFICATE OF CORRECTION

PATENT NO.    : 6,205,201 B1
DATED         : March 20, 2001
INVENTOR(S)   : Paul R. Prince It is certified that error appears in the above-identified patent and that said Letters Patent is hereby corrected as shown below:

<u>Title page,</u>
Item [73], the name of the Assignee reads "iCo Corporation". It should read
-- iGo Corporation --.

Signed and Sealed this

Ninth Day of September, 2003

JAMES E. ROGAN
*Director of the United States Patent and Trademark Office*